United States Patent

Boe

[11] 3,973,283
[45] Aug. 10, 1976

[54] TIRE CHANGE ASSIST TOOL
[76] Inventor: Arnold Boe, Box F, Laie, Hawaii 96762
[22] Filed: Nov. 17, 1975
[21] Appl. No.: 632,238

[52] U.S. Cl. .............................. 7/1 E; 254/131; 29/245; 214/332
[51] Int. Cl.² ................................ B60B 29/00
[58] Field of Search ............... 7/1 R, 1 G, 1 E; 254/131; 29/245; 214/332, 330, 331, 333

[56] References Cited
UNITED STATES PATENTS
1,746,387   2/1930   Faw .................................. 81/121 R
3,555,583   1/1971   Mousel ............................. 214/332

FOREIGN PATENTS OR APPLICATIONS
501,643   3/1951   Belgium ........................... 254/131
912,800   6/1954   Germany ........................... 7/1 G Primary Examiner—Al Lawrence Smith
Assistant Examiner—Roscoe V. Parker

[57] ABSTRACT

Tire change assist tool to facilitate mounting and demounting a wheel-carried tire on axle lugs. The invention comprises such a tool comprising an axially elongated rigid bar; socket means forming a wrench at one end of the bar adapted for axle lug nut engagement, means defining a fulcrum axially of the bar and terminally opposite the socket end thereof, and bar side arm means between the bar ends operatively associated with the fulcrum to support the wheel and tire for universal movement in ground-elevated relation responsive to the bar pivoting on the fulcrum and within the wheel locus of registration with the axle lugs.

10 Claims, 4 Drawing Figures

TIRE CHANGE ASSIST TOOL

BACKGROUND OF THE INVENTION

This invention has to do with tire change assist tools. More particularly the invention is concerned with a tire change assist tool which facilitates tire changing, obviating a number of tire change problems and which is particularly adapted to use by persons of normal or less than normal strength, especially women.

The need to change a tire is seldom anticipated and never welcome. Tire changing is a dirty and hazardous business, particularly when it has to be accomplished on the shoulder of a heavily traveled freeway or in the dark. Increasing numbers of women living and traveling alone has occasioned a greater incidence of women needing to change tires. While today's woman is perhaps willing and generally familiar with the procedure for changing a tire, the nature of the tire mounting and the sheer weight of the wheel and tire effectively precludes physical carrying out of a tire change operation despite the desire to do so.

Tire changing consists of a number of operations including initially the removal of the wheel cover from the wheel, loosening of the lug nuts, jacking the car to an elevated position sufficient to provide clearance for removal of the flattened tire and insertion of a replacement tire, removal of the lug nuts, removal of the wheel from the axle lugs, substituting the wheel from the trunk on the axle lugs, affixing the lug nuts, lowering the car from its jacked-up position, tightly securing the lug nuts, and replacing the wheel cover.

Two of the just mentioned operations are particularly critical for the person of modest strength. First of all the loosening of the lug nuts is a chore even for a person of substantial strength since these lug nuts are tightly applied in the first instance and typically are not removed for long periods of time. Automobile manufacturers generally provide, in combination with the jacking tool, a tire iron in one end of which a lug nut receiving socket is formed. The tire iron is so designed that substantial torque may theoretically be applied to a lug nut to assist in loosening the lug nut. In practice, however, tire irons have become elongated bars with sharpened ends opposite the lug nut receiving socket. The sharpened end is evidently intended to assist in removal of the wheel cover but in practice it shortens by a substantial amount the area of the tire iron which may be employed in applying torque to the lug nut. This is because the sharpened end cuts into the hand of the user if he grasps the tire iron at the farthest possible point from the socket end, thus to increase mechanical advantage. In practice, the hand must be moved inwardly a substantial distance on the tire iron in order to avoid being cut and resulting torque obtained is thereby diminished. In addition, the likelihood of skinned knuckles is very great in that the hand must closely brush the fender of the automobile which on most cars extends a substantial distance out beyond the tire. The proximity of the tire iron to the automobile fender effectively precludes the use of the foot to apply pressure to the tire iron and thereby torque to the lug nut either because there is no space for the reasonable purchase of a foot on the tire iron or because of the hazard of damaging the fender by scraping a foot therealong.

Moreover, the configuration of the typical tire iron i.e. an elongated rod with a bent socket head and a sharpened end opposite is not very convenient for removal of wheel covers either. It generally turns out that the arc through which a tire iron may move when its sharpened end is engaged under a wheel cover, is too short to effectively remove the wheel cover before the opposite or socket end of the tire iron hits the fender. To avoid this some persons twist the tire iron and thereby wedge the wheel cover from the wheel. Again, persons of modest strength are unable to resort to this expedient and a tire change may be frustrated at the very outset by the inability to remove the wheel cover.

Assuming that these just mentioned difficulties are overcome, the greatest difficulty still remains. Having wrestled the replacement tire from the trunk and dragged the flattened tire from the axle lugs, dropping it onto the ground, the problem remains of how to mount the replacement tire on the axle lugs. As any person who has ever changed a tire will attest this task of lifting and simultaneously registering five lug receiving holes in the wheel with the axle lugs is no simple matter. For a woman or other person of modest strength the difficulty of lifting the wheel and maintaining it in a controlled position while maneuvering it slightly left and right and slightly up and down to achieve registration with the lug nuts is simply beyond their physical capabilities. Because of the jacked-up position of the car, registration with the axle lugs is always seemingly tantalizing close but effective mounting eludes many persons because of the need to move the tire inward, upward and sideways in a varying mix of simultaneous and sequential movements to actually achieve the tire mounting. All this must be accomplished of course while the tire changer is kneeling in a most unusual position with typically the best lines in view blocked by the ever-present automobile fender.

It is accordingly an objective of the present invention to provide a tire change assist tool obviating the aforementioned difficulties. It is another objective of the invention to provide in a single tire change assist tool remedies for the mentioned difficulties including means for more expeditiously and effectively removing wheel covers, means for obtaining greater torque on lug nuts by using the weight of the person changing the tire rather than merely that person's strength, means assuring a better grip on lug nuts for more effective turning thereof when torque is applied, means for supporting the replacement tire in position for facile registration with lug nuts, all without substantial exertion by the tire changer. It is a further objection to provide a tire change assist tool having these features which is small, compact and stores flat, in approximately the same space now occupied by a conventional tire iron. It is a still further objective of the invention to provide these features in a tire iron of low cost, simple construction, and substantial durability.

SUMMARY OF THE INVENTION

These and other objects of the invention to become apparent hereinafter are realized in accordance with the present invention in a tire change assist tool for facilitating mounting and demounting a wheel-carried tire on axle lugs wherein the tool comprises an axially elongated rigid bar; means forming a wrench socket at one end of the bar adapted for axle lug nut engagement; means defining a fulcrum axially of the bar and terminally opposite the socket end thereof; and bar side arm means between the bar ends operatively associated with the fulcrum means to support the wheel and tire for universal movement in ground-elevated relation responsive to the bar pivoting on the fulcrum and within the wheel locus of registration with the axle lugs. In further aspects of the present invention, the tire change assist tool includes a removably retained socket member defining a socket opening laterally of the bar, the socket member defining a box wrench for lug nuts. Further the side arm may be pivoted in the longitudinal plane of the bar for supporting the wheel and tire in locally left or right rolling relation. Further the tire change assist tool includes prying structure formed on the bar remote end of the side arm, and adapted to separate a wheel cover from the wheel by manipulation of the bar to pivot the side arm on the tire sidewall with the structure in engagement between the wheel and the wheel cover.

In particularly preferred embodiments the side arm comprises a shaft extending substantially normal to the bar, and a pad longitudinally axially journalled on the shaft; the pad is adapted in one mode of tool use for hand or foot actuation to apply lug nut-turning torque through the bar to the socket in lug nut engagement, and in a second mode of tool use for supporting the wheel carried tire in locally left or right rolling relation by the pad pivoting about the shaft, while the tire is ground elevated for universal movement. In this and like embodiments the lug nut-receiving socket may open laterally and at an approximately right angle to the longitudinal axis of the bar, suitably extending parallel to the side arm extension, whereby the side arm pad projects outward for easy access for hand or foot when the socket is lug nut-engaged. In further aspects of the invention, the tire change assist tool includes the socket being differentially formed with localized lug nut engaging portions to circumferentially engage a lug nut only at the socket mouth as in a box wrench relation; and the mentioned prying structure comprising a flange extension supported by the side arm shaft in projecting relation beyond the pad, the flange being adapted to pryingly engage a wheel cover when the pad is pivoted on a tire side wall by bar manipulation.

In a still further aspect of the invention there is provided in a tire change assist tool having an axially elongated bar and a lug nut receiving socket of a depth substantially greater than the lug nut height formed at one end of said bar, the improvement comprising the socket being differentially formed with localized lug nut engaging portions to circumferentially engage a lug nut only at the socket mouth.

BRIEF DESCRIPTION OF THE DRAWINGS

The invention will be further described as to an illustrative embodiment thereof in conjunction with the attached drawings in which.

DESCRIPTION OF THE PREFERRED EMBODIMENTS

Figure 1:
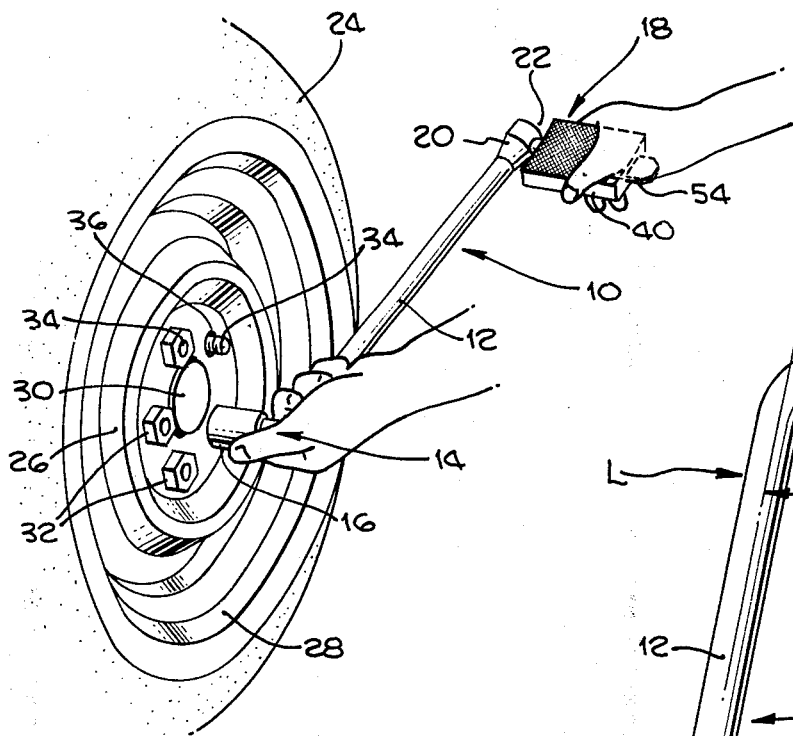
FIG. 1 is a pictorial view of the tire change assist tool in use for loosening lug nuts.
Figure 2:
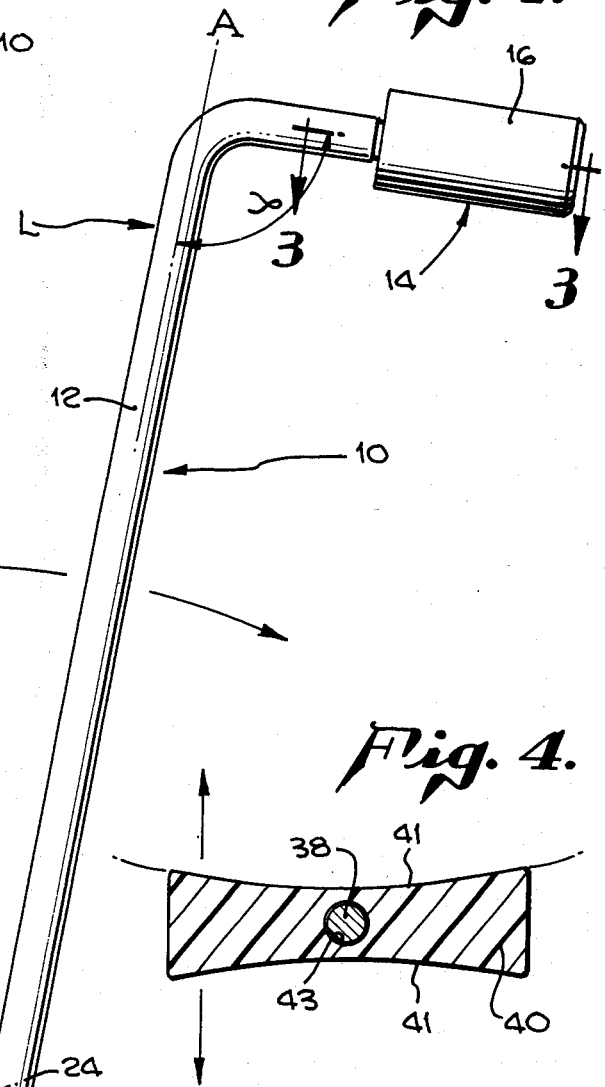
FIG. 2 is a view in vertical elevation of the tire change assist tool deployed for lifting and orienting a replacement tire for lug nut mounting, the tire being shown in phantom lines.

The tire change assist tool is shown at 10 in FIGS. 1 and 2 in its alternate use modes. The tool 10 includes a center portion, elongated rigid bar 12, a first operating head generally indicated at 14 and comprising a wrench socket 16 at one end of the center bar portion 12, and at a right angle thereto; and a second operating head generally indicated at 18 and comprising an axial terminal boss 20 and a side arm structure 22.

With reference particularly to FIG. 1 tire 24 is mounted on wheel 26 in the conventional manner by rim 28. Wheel 26 is secured to axle 30 by lug nuts 32 threaded onto axle lugs 34, the lugs being five in number and projecting outward from axle 30 in registration with the five wheel lug apertures 36.

The first problem in tire changing is removing the lug nuts 34 from the axle lugs 32. For this purpose the present tool has significant features. Initially the tool 10 has the angularly disposed wrench socket member 16, which may be of a particular improved configuration shown in FIG. 3 and described hereinafter. Additionally the tool 10 has at its opposite end side arm structure 22 shown to include a shaft 38 projecting at angle β to the longitudinal axis A of the tool bar portion 12, the angle β being complementary i.e. opposite and equal to the angle α at the wrench socket end of the tool e.g. both may be between 95° and 105°, whereby arm structure 22 and socket member 16 are axially parallel to each other. The shaft 38 may be secured in boss 20 formed as a terminal enlargement of the tool bar 12 or be an angled continuation of the tool bar. Boss 20 is conveniently a welded addition to bar stock or may be heat formed into the desired configuration shown in Figures. Journaled on shaft 38 is a pad 40 typically comprising (see FIG. 2) a hard tough material such as rubber or synthetic organic plastic having upper and lower surfaces 41 suitably grid-like and a central bore 43 through which the shaft 34 extends in journaling relation, through bushings 42 at opposite ends of the pad.

In the first mode of use of the tool 10, the wrench socket 16 is engaged with lug nut 32 and the tool rotated counterclockwise (upward). At this point a substantial advantage of the present inventor's tool becomes apparent: Because of the large surface area of the pad 40 and its placement on the end of the tool 10 opposite the point of lug engagement and in outward projecting relation, the pad is readily grasped and great torque is thereby applicable to the socket end without concern for cutting the hand or banging knuckles on a fender. Moreover, the pad 40 may be pressed upon by the foot, thus vastly increasing the force applied. For such foot pressure of course the tool should be oriented so that a downward pressure on the pad is obtainable. Also the journalling of the pad 40 on shaft 38 enables the pad to remain in one attitude, e.g. horizontal, despite the tool 10 movement in an arc as the nut 32 turns. In this manner even relatively modest strength persons are enabled to apply the necessary torque to loosen lug nuts.

Once the lug nuts 32 have been removed and the car jacked up (by means not shown) and the flat tire removed from the axle lugs 34, the tool 10 is further used, and in its second mode, to assist in mounting the new or replacement tire, as will now be described.

The mounting of a replacement wheel and tire assembly on elevated lug nuts is a difficult problem, as noted above. Not only must the effort to lift the tire and wheel be made from an awkward stance, but the registration of the wheel apertures with the axle lugs must be accomplished while endeavoring to push the wheel inward, away from the body and onto the axle lugs, all the time holding a weight near the limits of physical capability.

This problem is obviated by the present tool 10. With reference particularly to FIG. 2 it will be seen that second operating head 18 is, in this mode of use, placed at or on the ground 46 suitably on a hard surface such as pavement, and in underlying position to the axle 30, just outward of the plane of the axle lugs 32. The replacement tire and wheel, shown in phantom in FIG. 2 is rolled onto the pad 40 while the pad is substantially flat on the ground 46. It will be observed from a consideration of FIG. 2 that the boss 20 at the end of bar 12 defines a fulcrum with the side arm structure 22 being the locus of force application as the bar 12 pivots about the boss 20. For this purpose, the boss 20 can be configured as a truncated cone partly cylindrical at 50 and inwardly axially beveled at its outermost extremity to form a downwardly conical step 52 to ease pivoting of the boss 20 from a vertical position.

Once placed on the pad 40 the tire 24 is easily lifted the several inches necessary to aline the height of the wheel apertures 36 with the height of the axle lugs 32 by pulling on the bar at point L. Registration of the apertures 36 and lugs 32 is substantially easier because the wheel carried tire 24 is not being merely hand held while seeking registration.

Figure 4:
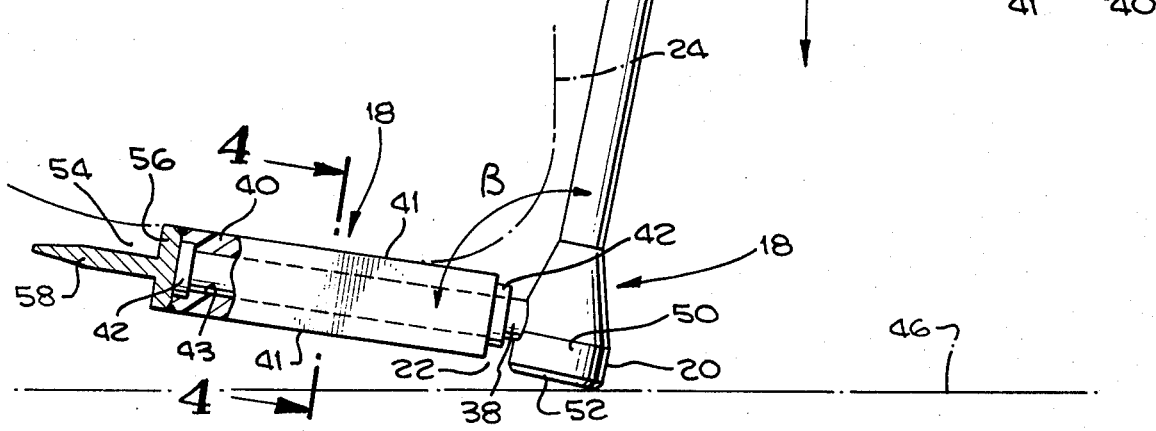
FIG. 4 is a view in transverse section of the side arm shaft and pad taken on line 4—4 in FIG. 2.

But, additionally, the pivotability of the pad 40 about fixed shaft 38, enables rocking of the wheel and tire slightly left and right while raised by the pad 40 (see FIG. 4) and without substantial physical effort, accompanied if necessary by coordinated raising or lowering of the wheel aperture height to effect positioning of the wheel in its locus of registration with the axle lugs, and to effect registration. Once registered by the described universal i.e. multiple axis movement, a simple inward push on the wheel 26 while relaxing the pulling pressure at point L on the upper end of the bar 12 eases the wheel onto the lugs 32.

Completion of the tire change then quickly follows with the tightening of the lug nuts to a secure degree being facilitated by the ability to use substantial hand or foot pressure on the pad 40 when the wrench socket 16 is nut-engaged.

Figure 3:
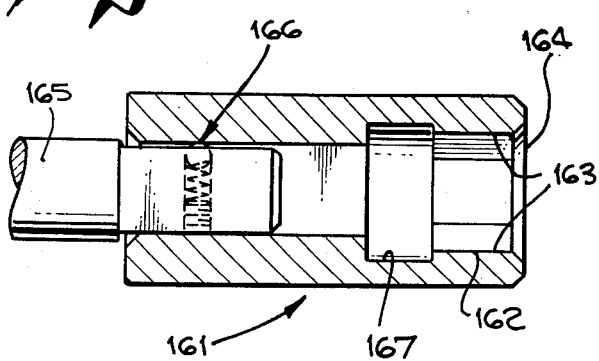
FIG. 3 is a detail view, in longitudinal section, of the socket wrench feature of the present invention, said view being taken on line 3—3 in FIG. 2.

With reference particularly to FIG. 3, there is shown at 161 a preferred form of wrench socket. The socket 161 is formed with an inner bead 162 of polygonal shape defining nut engaging faces 163. Beyond the bead 162 the socket is enlarged at 167 to greater size against nut engagement there. I have found that a socket thus differentially formed with localized lug nut engaging portion or faces 163 engages a lug nut circumferentially and only at the socket mouth 164, whereby slippage of the socket wrench is reduced during torque application, in the manner of a box wrench, although the wrench 161 is a socket wrench. Further the socket 161 is removably carried on male driver 165 retained thereby detent 166.

An additional feature hereof worthy of specific mention is the prying structure shown at 54 and including a base 56 secured to the outboard end of pad 40 and its outwardly projecting tapered flange 58 which is narrowed to a thickness adapted to interfitting the space between a wheel cover and a wheel. Advantageously, the prying structure 54 is offset from the longitudinal axis A of the bar 12 and carried at the angle $\beta$ thereto, whereby prying force may be applied to a wheel cover (not shown) by resting the pad 40 against a tire sidewall and applying a prying force to the wheel cover by pivoting the tool 10 about the pad locus of engagement with the tire sidewall. In this manner very great force can be brought to bear, and with the hands and tool end some considerable distance from the car fender, to prevent injury to the user and damage to the vehicle should the wheel cover suddenly loosen.

I claim:

1. Tire change assist tool to facilitate mounting and demounting a wheel-carried tire on axle lugs, said tool comprising an axially elongated rigid bar; means forming a wrench socket at one end of said bar adapted for axle lug nut engagement, means defining a fulcrum axially of said bar and terminally opposite the socket end thereof; and bar side arm means between the bar ends operatively associated with said fulcrum means to support said wheel and tire for universal movement in ground-elevated relation responsive to said bar pivoting on said fulcrum and within the wheel locus of registration with said axle lugs.

2. Tire change assist tool according to claim 1 in which said socket opens laterally of said bar.

3. Tire change assist tool according to claim 1 in which said socket defines a box wrench for lug nuts.

4. Tire change assist tool according to claim 1 in which said side arm is pivoted in the longitudinal plane of said bar for supporting said wheel and tire in locally left or right rolling relation.

5. Tire change assist tool according to claim 1 including also prying structure formed on the remote end of said side arm adapted to separate a wheel cover from the wheel by manipulation of said bar to pivot said side arm on tire sidewall with the structure in engagement between said wheel and wheel cover.

6. Tire change assist tool according to claim 1 in which said side arm comprises a shaft extending substantially normal to said bar and a pad longitudinally axially journaled on said shaft; said pad being adapted in one mode of tool use for hand or foot actuation to apply lug nut-turning torque through said bar to said socket in lug nut engagement, and in a second mode of tool use for supporting said wheel carried tire in locally left or right rolling relation by said pad pivoting about said shaft while the tire is ground-elevated for universal movement.

7. Tire change assist tool according to claim 6 in which said socket member opens laterally and at an angle to the longitudinal axis of said bar.

8. Tire change assist tool according to claim 7 in which said socket extends oppositely from said side arm, whereby said arm pad projects outward for easy access to hand or foot when said socket is lug nut engaged.

9. Tire change assist tool according to claim 8 in which said member defines a socket differentially formed with localized lug nut engaging portions to circumferentially engage a lug nut only at the socket mouth, and removably retained on said bar.

10. Tire change assist tool according to claim 9 including also prying structure comprising a flange extension supported by said shaft in projecting beyond said pad, said flange being adapted to pryingly engage a wheel cover when said pad is pivoted on a tire sidewall by bar manipulation.

* * * * *